(12) United States Patent
Sainfort et al.

(10) Patent No.: US 9,992,624 B2
(45) Date of Patent: Jun. 5, 2018

(54) SYSTEMS, DEVICES AND METHODS FOR ACCURATELY TRACKING WORKERS AND ASSETS

(71) Applicant: Condor Analytics, Inc., Miami, FL (US)

(72) Inventors: François Sainfort, Miami, FL (US); Andres Alva, Miami, FL (US); Lee F. Loree, Atlanta, GA (US)

(73) Assignee: CONDOR ANALYTICS, INC., Miami, FL (US)

( * ) Notice: Subject to any disclaimer, the term of this patent is extended or adjusted under 35 U.S.C. 154(b) by 0 days. days.

(21) Appl. No.: 15/477,915

(22) Filed: Apr. 3, 2017

(65) Prior Publication Data

US 2017/0289760 A1  Oct. 5, 2017

Related U.S. Application Data

(60) Provisional application No. 62/317,528, filed on Apr. 2, 2016.

(51) Int. Cl.
| | | |
|---|---|---|
| *H04W 24/00* | (2009.01) | |
| *H04W 4/02* | (2018.01) | |
| *H04W 4/00* | (2018.01) | |
| *H04W 52/02* | (2009.01) | |
| *H04W 4/20* | (2018.01) | |
| *H04W 4/04* | (2009.01) | |

(52) U.S. Cl.
CPC .......... *H04W 4/023* (2013.01); *H04W 4/008* (2013.01); *H04W 4/043* (2013.01); *H04W 4/206* (2013.01); *H04W 52/0216* (2013.01)

(58) Field of Classification Search
CPC ..... H04W 4/023; H04W 4/008; H04W 4/043; H04W 4/206; H04W 52/0216
USPC ........................................................ 455/456.1
See application file for complete search history.

(56) References Cited

U.S. PATENT DOCUMENTS

| | | | |
|---|---|---|---|
| 9,020,848 B1* | 4/2015 | Ridge ................. | G06Q 40/125 705/32 |
| 2003/0013459 A1* | 1/2003 | Rankin .................... | G07C 1/20 455/456.1 |
| 2015/0057981 A1* | 2/2015 | Gross ........................ | G01S 5/06 703/1 |
| 2016/0078698 A1* | 3/2016 | Moses ..................... | G08B 25/14 340/5.23 |
| 2016/0234653 A1* | 8/2016 | Chu ....................... | H04W 4/043 |
| 2016/0295356 A1* | 10/2016 | Schoner ............. | G06K 7/10366 |
| 2016/0335819 A1* | 11/2016 | Lingan ................. | H04W 4/021 |

* cited by examiner

*Primary Examiner* — William Nealon
(74) *Attorney, Agent, or Firm* — Thomas | Horstemeyer, LLP

(57) ABSTRACT

Various examples of methods, systems, apparatus and devices are provided for accurately tracking of workers and assets. Aspects of the present disclosure include tracking the location and other information for workers and assets in locations where knowledge about such workers and assets is desirable. The disclosed worker and/or asset tracking is particularly suitable for locations where the structural components are added, modified or moved during a monitoring period. Such structural components can block all or part of GPS, WiFi and RFID signals, or where it may be otherwise impractical to utilize other forms of signal generation.

20 Claims, 4 Drawing Sheets

SYSTEMS, DEVICES AND METHODS FOR ACCURATELY TRACKING WORKERS AND ASSETS

CROSS REFERENCE TO RELATED APPLICATIONS

This application claims priority to, and the benefit of, U.S. provisional application entitled "Devices and Methods for Accurately Tracking Workers and Assets" having Ser. No. 62/317,528, filed Apr. 2, 2016, the entirety of which is hereby incorporated by reference.

BACKGROUND

The construction industry is inherently prone to litigation since claims are normally affected by a large number of complex and interrelated factors. Construction projects are fertile breeding grounds for disputes and conflicting claims often arise between the many parties involved in any given undertaking. Construction disputes can arise from interpretation of the contract, unforeseen site conditions, variation orders by the client, acceleration and suspension of works, and so on. Almost any aspect of the construction process can trigger a dispute, but, put simply, most construction disputes can be boiled down to one or more of product, people and process, where product is the building itself, the people are those working on the project and process is the planning and work done to create the product.

In a complex environment, such as a construction site, it can be difficult to generate the records necessary to provide a "paper trail" of the project for warranty, liability, management and/or other purposes. For example, if an installed building component such as, e.g., a roof fails inspection, then it will be necessary to retrieve information about the construction of that component, including the materials specified, the materials actually used, and the number of hours expended by the roofing contractor to construct the roof. Similarly, if the roofing contractor seeks additional payment for a change order, for example, the contracts will require submission of detailed records supporting that additional work.

Often, personnel who are employed in such construction settings do not keep accurate records about their time working on the site. Workers at the site (electricians, plumbers, welders, etc.) are tradesmen skilled in their field, but not trained, equipped, or necessarily willing to collect detailed and reliable data at a construction site. Moreover, such workers are more likely to be transitory and, as such, may be difficult to locate months or years after completion of the project if testimony about their activity on the project is needed, such as in a legal dispute or in a regulatory inquiry, the latter of which can include wage and hour or safety investigations.

Often, the claims arising in a construction dispute are intertwined, meaning the identification of the specific reasons underlying a complaint or dispute will involve the arduous task of going through a wide variety of records generated during the construction project in the attempt to discern the proximate cause of the defect or dispute at issue. Because construction records are typically not generated or stored in a form that aligns with the factual record that needs to be developed to make a legal claim, construction disputes are often fraught with subjectivity. Such project complexity and subjectivity combine to make construction projects expensive and cumbersome to litigate. Accordingly, those contractors or owners who are entitled to recover damages for non-performance, defects or other breaches of the construction contract(s), may decline to pursue a claim that may cost them more to litigate (or mediate or arbitrate) than they stand to recover in damages.

SUMMARY

Aspects of the present disclosure relate to devices and methods for tracking the location and other information for workers and assets in locations where knowledge about such workers and assets is desirable. The disclosed methodology is particularly suitable for locations where the structural components are added, modified or moved during a monitoring period, and where such structural components can block all or part of GPS, WiFi and RFID signals or in locations where such monitoring methodologies are not practicable.

In significant aspects, a constructed network conforming to the metes and bounds of the location to be monitored is provided. A number of Bluetooth beacons suitable for receiving signals from a plurality of low energy Bluetooth transmitters, and the placement thereof, is determined. A worker or asset is associated with a monitoring device comprising a low energy Bluetooth transmitter, a battery, a temperature sensor, a buzzer and/or an accelerometer. At least one unique identifying feature is associated with the worker or asset to allow tracking thereof. An advertising signal can be periodically sent from the Bluetooth beacons to each monitoring device within the constructed network during the monitoring period. Each monitoring device can, independently, transmit an activity signal to the Bluetooth beacons during a signal transmission period associated with the advertising signal. A plurality of activity signals associated with the worker or asset can be provided in response to the advertising signals, where the activity signals provide substantially accurate activity and location information about the worker or asset within the constructed network during the monitoring period.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. It is to be understood that both the foregoing general description and the following detailed description are exemplary and explanatory only and are not restrictive of the disclosed embodiments. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
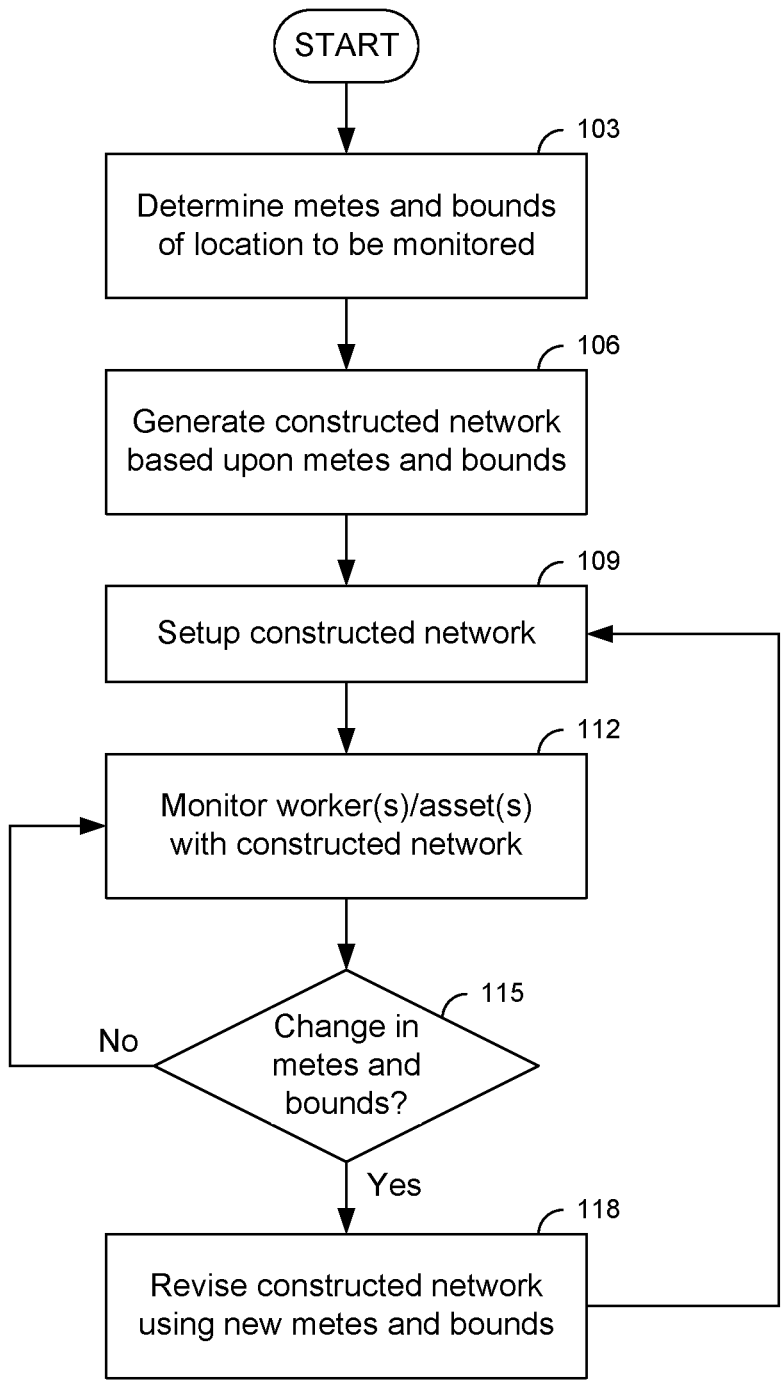
FIG. 1 is a flow diagram illustrating an example of asset and/or worker tracking using a constructed network including beacons, in accordance with various embodiments of the present disclosure.

Disclosed herein are various embodiments of systems, devices and methods related to accurately tracking of workers and assets. Aspects of the present disclosure relate to systems and methods for obtaining information about an asset or worker during one or more monitoring events, where such information is generated within a constructed network using a monitoring device as set out in more detail herein. The location and other information can be for workers and assets in locations where knowledge about such workers and assets is desirable. The disclosed aspects are particularly suitable in locations where the structural components are added or moved during a monitoring period, and where such structural components can block all or part of GPS, WiFi and RFID signals, or where it is otherwise impractical to utilize other forms of signal generation. Reference will now be made in detail to the description of the embodiments as illustrated in the drawings, wherein like reference numbers indicate like parts throughout the several views. While several implementations are described in connection with these drawings, there is no intent to limit the disclosure to the implementations or implementations disclosed herein. To the contrary, the intent is to cover all alternatives, modifications, and equivalents.

Tracking of assets or workers may be established using global positioning system (GPS), wireless networks (e.g., WiFi), and radio frequency identification (RFID) signals. However, such signals are often not suitable for ongoing monitoring of workers or assets in construction sites, especially where the structural aspects of the location is greatly modified over the course of a monitoring event. One example of such a location where GPS, WiFi and RFID signal blocking structural components are incorporated or moved within the location during a monitoring period is a construction site. In this regard, structural aspects of a construction location will change over the period that monitoring is desired. When the project is started, the workers and assets can typically be monitored using cellular signals or RFID methodologies because signal transmission will generally not be blocked by structural aspects of the project. When structural components that block GPS, WiFi or RFID signals are added, modified, moved around or incorporated into the location of interest during the monitoring period, the location will have to be continuously re-surveyed to identify the locations of the signal blocking structural components. Such re-surveying is also not practicable when signal blocking structural components are continuously being moved around the location to be monitored. Moreover, even if such re-surveying were practicable, uncertainties would be incorporated into the information so generated, thus making the activity information less reliable.

As a construction project proceeds and structures are built, signal transmission using existing signal generation methodologies will become problematic. For example, the building of a fireproof stairwell will be likely to block signal transmission through and about that location. Thus, any worker or asset located proximal to that stairwell at a signal collection time will likely not be accurately monitored at that time. Moreover, if the worker or asset is stationed at that location for an extended period of time, such as if the worker or asset is engaged in a task that occurs in a substantially fixed location, an extended period of time could go by without that worker or asset being monitored. For instance, a plumber could be engaged for several hours or days in building a bathroom facility. If that bathroom location is oriented in a location where a GPS, WiFi or RFID signal is not available, the plumber will not be tracked during his time at that location. If an issue regarding the labor time and/or quality of the work conducted to construct that bathroom comes up at a later time, accurate information about that worker's labor will not be obtainable.

In a further example, using GPS, WiFi or RFID signals to track a worker or asset can be problematic in a construction environment because of the presence of building materials or construction equipment in the site. Such materials and equipment may have only a temporary presence in a location, such as when a large piece of metallic construction material may be being transported through the construction site. However, the presence of the material at the time when a monitoring signal is obtained will make the overall information obtained about a worker or asset less reliable. While one or even a few missed activity signals may be acceptable when evaluating the worker or asset information at a later date, a large number of absent or missed activity signals will generate a lack of confidence in the accuracy of the information obtained from the location. Moreover, a large number of absent or missed activity signals will give rise to ability of a party in a construction dispute being able to challenge the admissibility of the information obtained in a court or other legal proceeding.

Similarly, in retail establishments, structural components are often moved within and amongst various locations for merchandising purposes. Moreover, in recent years, more flexible retailing environments have become popular in which "stores within stores" or "popup stores" are established to provide semi-permanent store locations situated in certain locations. Other environments, such as festivals, sporting events, or the like can comprise structural components that change from hour to hour, day to day or week to week, where it would be difficult to use GPS, WiFi or RFID to track workers or assets on a regular and ongoing basis. Moreover, as with construction sites, such semi-permanent locations are more likely to utilize temporary or contracted workers, many of whom are more likely to possess less training and be more transient. Thus, if issues arise at a later time regarding their labor or the quality of performance, it may be difficult to locate them for testimony. As such, the ability to generate information about their time at the location being monitored can be highly beneficial.

Moreover, even where structural components in a location might block GPS, WiFi or RFID signals, it still may be impractical to use these methodologies to capture activity signals. For example, both GPS and require lots of energy, making them difficult to implement. In addition, the short range of RFID may make it too expensive to track workers or assets this way. RFID tracking is limited to designated entry and exit points on a site as it would be cost prohibitive to include RFID readers throughout the site. Or, the location to be monitored could be in a location where WiFi access is not available, such as due to the absence of broadband access. There remains a need for methods, systems and devices that allow monitoring of assets and workers in locations where GPS, WiFi and RFID do not allow accurate tracking due to structural components present in the locations or where tracking using these methodologies is not practicable.

In aspects of this disclosure, the term "substantially" is meant to permit deviations from the descriptive term that do not negatively impact the intended purpose. All descriptive terms used herein are implicitly understood to be modified by the word substantially, even if the descriptive term is not explicitly modified by the word "substantially."

A "monitoring event" refers to situations in which a user wishes to track the location of one or more of an asset or a worker in a location of interest over a period of time. An exemplary monitoring event can have a starting point when the monitoring device is affixed to an asset or associated with a worker, such as by incorporation on or into an ID badge, helmet, belt, uniform, or the like. The monitoring device can periodically provide information regarding or associated with the asset or worker when in the location of interest during the period of time over which information about the asset or worker is desired. An ID badge can include a magnetic stripe, RFID, or other signal generation capability, such as to allow doors to be entered or time card tracking. However, as described herein, the signal generation capability native in existing badging systems is not suitable to accurately track workers or assets in locations where structural components are added or moved within the location to be monitored over the period of the monitoring event.

In non-limiting examples, a location where assets or workers will be monitored over a period of time is one where structural components are likely to be added, modified or moved during the monitoring period such as construction sites, retail establishments, warehouse and distribution centers, hospitals, university campuses, military bases, festival sites, sporting event locations, airports, large storage facilities, schools, nursing homes, assisted living facilities, cruises ships, etc.

In some aspects, a plurality of activity signals associated with a worker or asset in need of monitoring in a location are generated, where the activity signals can be generated periodically according to a pre-determined schedule. Substantially all of the scheduled activity signals associated with each asset or worker can be obtained during the monitoring event. A location in need of monitoring that is configured in advance of the monitoring event is termed a "constructed network," as discussed elsewhere herein. In this regard, there is substantially no blockage of one or more of the activity signals associated with a worker or asset in a location in need of monitoring, where that location comprises a constructed network. When substantially all of the activity signals for each of the plurality of workers or assets during each monitoring event are collected as information, substantially accurate activity information can be generated over the monitoring period in relation to the tracked worker and asset.

In substantial aspects, the activity signals can be generated by Low Energy Smart Bluetooth® transmitters incorporated in a hardware device that is associated with a worker or an asset as discussed elsewhere herein. In further aspects, the activity signals are not generated by hardware devices configured with GPS, WiFi or RFID capability. In some aspects, the hardware devices can include WiFi capability to allow activity signals and other monitoring event information to be transmitted directly to a remotely located computing device such as, e.g., in the cloud, however, the activity signals will still be generated using low energy Bluetooth® methodology as disclosed elsewhere herein.

While the methodology disclosed herein is suitable for monitoring workers or assets in a wide variety of locations and situations, as noted, it has been found that particular utility is provided when used in a location where structural aspects of the location change regularly during the monitoring period. In some aspects, the methodology comprises monitoring of a location comprising one or more structural components capable of blocking signals generated by GPS, WiFi and RFID signal generating componentry, where such structural aspects are being incorporated, modified or moved within the location during the monitoring period. While the presence of such GPS, WiFi and RFID signal blocking structural components generally makes it difficult to generate consistent and accurate monitoring information about the worker or asset over the period of time, incorporation, addition or movement of the structural components within the location during the monitoring period greatly exacerbates the difficulty of obtaining reliable worker or asset activity information. That is, in a location where structural components that can block GPS, WiFi and RFID signals are stationary or otherwise not moved during a monitoring event, work arounds can be generated to augment or correct for blocked signals during use. With a fixed layout, the metes and bound of the GPS, WiFi and RFID coverage (or lack thereof) over the location to be monitored can be defined. Since the structural components that block transmission of GPS, WiFi or RFID signals do not change during the monitoring period, the periodic absence of one or more expected worker or asset signals can, for example, be extrapolated from other information, such as the signal obtained prior to and subsequent to the missing information, where the missing information is a result of signal blockage. In short, in locations where structural component substantially do not change during the monitoring period, the known location of the signal blocking structure can be incorporated to generate any information about the worker or asset over a monitoring period.

While construction sites/projects are locations that are particularly suitable to the systems, devices and methods of the present disclosure, the methodology is suitable for use in other locations where workers and assets are located, and where structural components that block GPS, WiFi or RFID signal transmission exist or where current signal generation methodologies are not practicable, but would be beneficial for monitoring over time. In further aspects, the disclosed methodology shows utility in situations where it would be too costly to implement RFID readers throughout a site in need of monitoring. Yet further, the disclosed aspects show utility in locations where it would be difficult to deploy WiFi capability, such as where broadband or other forms of internet access are not available. Additionally, many locations are not suitable for monitoring by cellular or GPS signals. The disclosure illustrates broad applicability to monitoring locations in need of monitoring because the systems, devices and methods offer inexpensive, flexible, expandable and self-contained solutions, among other things.

During a monitoring event, monitoring device information that is generated and transmitted by one or more monitoring device(s) may be reviewed at, e.g., a remote location substantially in real-time to follow the travel path of the monitoring device, and therefore the worker or asset(s) with which the device is associated. Such real time (or near real time) monitoring can be used to confirm that a worker or asset is present at the site (or constructed network) during the monitored period. For example, a subcontractor may have committed to having a number of workers present on a construction site for a project. The construction manager or site supervisor may wish to confirm that the number of committed workers are present on the site in real time. Alternatively, the activity signals can be stored for later review and use. Such real time monitoring can be useful to catch problems early.

In some aspects, the plurality of activity signals generated from a monitoring device associated with a worker or asset in a location can be admissible as evidence of the activity of that worker or asset in a legal proceeding where the activity of the worker or asset is at issue. "Evidence" is a term that is defined as "information presented for the purpose of deciding a disputed question." Evidence may be presented in court and other legal or legal-like proceedings in accordance with legal standards well-known to those of ordinary skill in the art.

The aspects disclosed herein allow the activities of workers and assets to be accurately monitored in locations where the structural components thereof substantially preclude consistent transmission of GPS, WiFi or RFID signals. Moreover, particular utility is shown for locations where structural aspects are changing over the monitoring period. Accordingly, a substantial aspect of the present disclosure comprises a network constructed for monitoring assets and/or workers on an ongoing basis at a selected location where the structural aspects of the location are changed or modified over the monitoring period. The selected location can be setup as a constructed network, which can be defined by the metes and bounds of the location in which monitoring of an asset and/or worker over time is needed (or desired). Such metes and bounds substantially serve as the boundary of the area to be monitored.

Referring to FIG. 1, shown is a flowchart illustrating an example of the asset and/or worker tracking in accordance with various embodiments of the present disclosure. Beginning at 103, the metes and bounds of the selected location to be monitored are determined. For example, blueprints, building information modeling (BIM), survey information or other detailed information about the location in need of monitoring can be utilized to determine the metes and bounds of the location to be monitored. As can be understood, the metes and bounds of the monitored area can change over time as additional sections or stories of a building are added during construction. Construction schedules can be used to identify changes in the metes and bounds of the location, and to anticipate changes in the constructed network over time. Data incorporating the metes and bounds of the constructed network to be setup or constructed can be uploaded for use to define the location of the various components of the constructed network. If such detailed information is not available in pre-existing data form, a survey can be generated to define the metes and bounds of the constructed network. The survey data can be incorporated into appropriate form to be uploaded for use in determining the constructed network.

The constructed network is generated at 106 using the metes and bounds of the location to be monitored. The metes and bounds of the constructed network can comprise all or part of a location or site. For example, if the constructed network relates to a construction site, the entire perimeter of a construction site can be used as the metes and bounds of the constructed network, or only a portion of the site (e.g., the area of the building itself) can be used to determine the metes and bounds of the constructed network. This may apply to cases where highly regulated or high value activities are being conducted. Similarly, in a retail or other location, the constructed network can comprise all or part of the entire establishment, or only part of the establishment can be included in the constructed network.

Once the location of the constructed network is determined, it can be setup at 109. A plurality of beacons comprising Bluetooth® transceivers (or receivers and/or transmitters) are positioned in fixed locations about the location. These Bluetooth® transceivers (or receivers/transmitters) can be battery operated or supplied by an external electrical source (e.g., a battery pack or an AC/DC power converter). In significant aspects, the constructed network is provided by positioning a plurality of beacons with Bluetooth® transceivers (or receivers/transmitters) in suitable configurations around the location in need of monitoring over time. In creating the constructed network, the Bluetooth® beacons are positioned to substantially cover the entire site where activity monitoring is desired, and the coordinates of each monitoring device are captured. Overlapping coverage is provided by the beacons to allow for accurate tracking of the worker(s) and/or asset(s). The beacons can also be configured to monitor their operational conditions of themselves and communicate an indication of a problem to a remote server or other user device.

While location is determined using triangulation, in order to improve accuracy of the worker/asset tracking, a calibration grid is developed wherein a plurality of cells are generated to cover the area to be monitored. The plurality of cells together cover substantially the entirety of the location with each cell being monitored by more than one beacon. That is, two, three or more beacons can be positioned to receive monitoring device transmissions from the same cell area over time. For each of the plurality of cells, signal data can be generated that defines the location of that cell within the location to be monitored over time, thus providing calibration data for each cell. Such calibration data defines specific locations within and among the location to be monitored over time. Collectively, the calibration data from the plurality of cells and the associated location data comprises the constructed network, which substantially aligns with the location to be monitored over time.

When the location to be monitored over time comprises a single floor (or a substantially horizontal location represented by a floor location and a ceiling location), a plurality of (e.g., three or more) low energy Bluetooth® transceivers (or receivers/transmitters) can be used to generate locational data in the calibration step and in subsequent asset or worker monitoring in the substantially horizontal direction. The size and geometry of the location to be monitored will generally determine the number of beacons sufficient to generate accurate locational data. In many implementations, the Bluetooth® transceivers (or receivers/transmitters) can comprise Class 1 devices, which have a range of about 100 meters, as is known. In further aspects, the range of the Bluetooth receivers can be extended through use of an appropriate antenna. Generally, the locations to be monitored over time, such as construction sites etc., will be suitably covered by three or four or more beacons.

Once the constructed network is established, monitoring of the worker(s) and/or asset(s) can be carried out at 112. Transmissions from a monitoring device can be used to track the location or other information corresponding to the associated worker or asset. For example, signal strength and direction of a Bluetooth® transmission received by the beacons can be used to identify the location of the worker or asset associated with the transmitting monitoring device. The calibration data collected during the setup of the constructed network can be used to improve the accuracy of the location. Real time (or near real time) location information, alerts or warnings can be provided based on the identified location. Other information such as, e.g., temperature, humidity, acceleration, etc. can also be collected from the monitoring device for use. The activity data for the worker or asset can be automatically stored locally and/or remotely during monitoring for subsequent access and analysis.

In some situations, the location to be monitored over time will comprise more than one floor. In this regard, the constructed network can comprise a plurality of floors. As with a single floor/horizontal location, at least three or more beacons can be used for each floor level. The beacons with Bluetooth® transceivers (or receivers/transmitters) are positioned to provide coverage of the location in relation to each floor. In some situations, such as in a construction environment, floors will be added as the construction project progresses. In this regard, the constructed network can expand and become larger as more vertical locations are added and more beacons are added so as to allow activity monitoring of the newly constructed parts of the location.

It can be periodically determined at 115 if the metes and bounds of the monitored location change. For example, the construction schedule can be monitored and used to prompt a change in the constructed network. Notifications can be automatically sent to the architect, site supervisor and/or construction managers to verify if the expansion is on schedule or not. If the metes and bounds have not changed, then monitoring continues at 112. If the monitored area has changed, then the constructed network is revised at 118 to account for the new metes and bounds. The constructed network can then be setup at 109 by, e.g., adding, removing or repositioning beacons to provide appropriate coverage of the new metes and bounds as discussed herein. Calibration can also be performed to provide accurate location information before returning to monitoring of monitoring devices at 112.

As with the single floor (or alternatively, a substantially horizontal location) implementation, a plurality of cells are generated, where each cell is associated with a part of the location to be monitored during the calibration. Bluetooth® signals are generally only accurate in a substantially horizontal configuration. Thus, when additional floors are to be monitored in a location, a plurality of cells will be generated for each floor so as to generate accurate worker and/or asset activity data for each horizontal level, that is, within each floor vertical floor height. While new areas of the constructed network are being setup, monitoring may continue for areas of the constructed network that have not changed.

Figure 2:
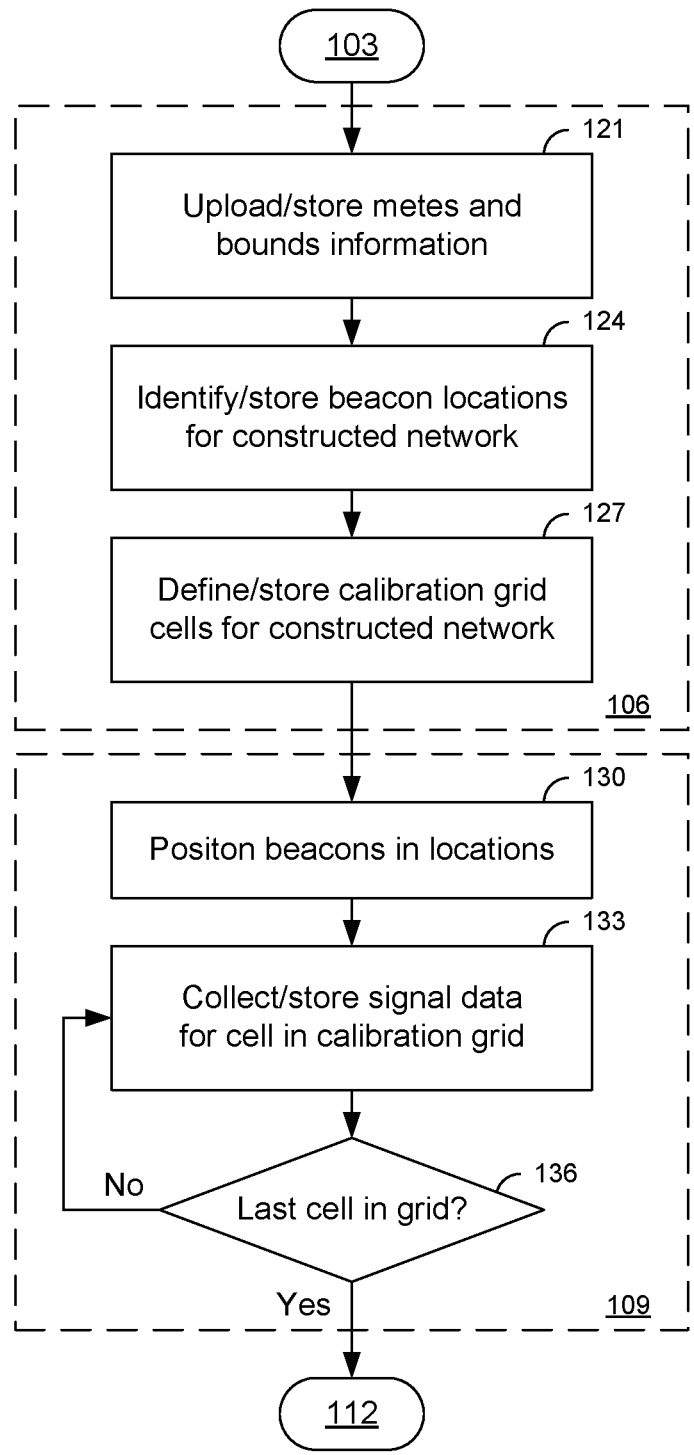
FIG. 2 is a flow diagram illustrating an example of generation and setup of the constructed network of FIG. 1, in accordance with various embodiments of the present disclosure.

Referring next to FIG. 2, shown is an example of the generation and setup of the constructed network of FIG. 1. After identifying the metes and bounds of the location to be monitored at 103, information about the metes and bounds is uploaded and can be stored in a local and/or remote database(s) at 121 to generate the constructed network. For example, blueprints of the construction site can be imported and stored for use in generating the constructed network. Other information such as, e.g., the construction schedule, timelines, deadlines, etc. can also be uploaded and stored for use. The fixed beacon locations around the location can be identified and stored in the database(s) based upon the metes and bounds information at 124. The beacons are positioned so that the Bluetooth® transceivers (or receivers/transmitters) provides overlapping coverage of the area being monitored. Knowing the range of the Bluetooth® devices, the locations of the beacons can be identified so that the constructed network covers the entire monitored area. Capture coordinates for each beacon is also determined. A calibration grid for the constructed network defining cells that over the entire site is developed at 127. The cells can be defined as squares, hexagons or other geometric shape, with capture coordinates assigned to, e.g., the center of each cell. The calibration grid, capture coordinates, and other information can be stored in the database(s).

With the constructed network defined, it can be setup for monitoring the location at 109. The beacons can be positions at the appropriate locations at 130, and can be fixed in position. After the beacons are positioned, the Bluetooth® coverage of the area being monitored is calibrated based upon the cells of the calibration grid. For example, a monitoring device including a Bluetooth® transceiver (or transmitter/receiver) can be located as the capture coordinates of a cell. At 133, the monitoring device transmits a Bluetooth® signal (e.g., in response to an integration such as an advertisement), and the Bluetooth® devices of each of the beacons can capture locational information for that cell such as, e.g., the transmitted signal strength and direction. With the corresponding capture coordinates, this locational information of the cells can be used to adjust the accuracy of location estimation for monitoring devices associated with the worker(s) and/or asset(s). The captured locational information can be stored in the database(s). At 136, it is determined whether the last cell of the calibration grid has been reached. If not, then a monitoring device is placed in positioned at the capture coordinates of the next cell and the corresponding locational information is captured by each of the beacons at 133. The calibration is repeated for each of the cells in the calibration grid until the last cell is reached at 136. At that point, the worker(s) and/or asset(s) can be monitored at 112.

When calibration is complete for the cells associated with a specific location, or range of locations, to be monitored over time, the plurality of Bluetooth® transceivers (or receivers/transmitters) of the constructed network are substantially fixed for the duration of the time that the location is to be monitored. While the constructed network can be added to as additional construction is conducted, previously installed beacons will generally remain substantially fixed as long as it is desirable to monitor activity in the metes and bounds of that part of the constructed network. "Substantially fixed" means that once calibration is completed, and the locational information of the cells is determined by the plurality of Bluetooth® transceivers (or receivers/transmitters), the beacons are not moved substantially during the time the assets or workers are being monitored. Thus, once the calibration step is performed, the location of the Bluetooth® transceivers (or receivers/transmitters) substantially does not change, thereby providing a substantially fixed constructed network defined by the plurality of beacons including Bluetooth® transceivers (or receivers/transmitters).

Figure 3:
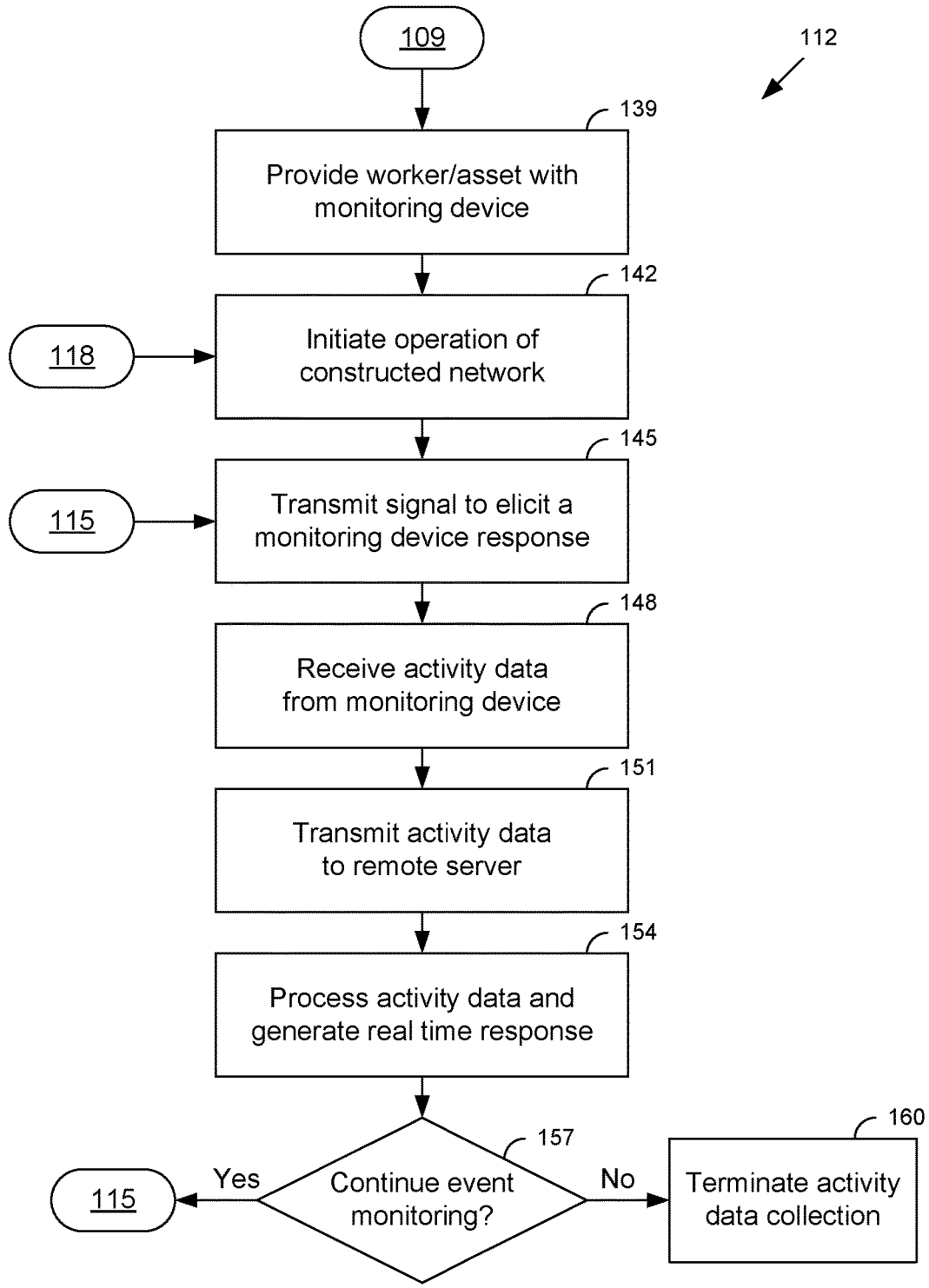
FIG. 3 is a flow diagram illustrating an example of asset and/or worker monitoring using the constructed network of FIG. 1, in accordance with various embodiments of the present disclosure.

Referring next to FIG. 3, shown is an example of the monitoring of worker(s) and/or asset(s) at 112 of FIG. 1 using the constructed network. Once the constructed network is generated, tags can be assigned to assets and/or workers to be tracked at 139, where the tag corresponds to the monitoring device assigned to the asset or worker. The tags can be a unique number, such as an asset or employee identification, or the tags can comprise any other suitable method of identification that allows the asset or worker to be consistently identified over a period of time. The tags are associated with the monitoring device, along with other information that can be useful to track the location or other conditions of the asset or worker. For example, where the asset is a vehicle, the asset tag can be associated with information about the asset relating to a unique identifier, such as a serial number, assigned asset number, as well as non-specific information such as asset type, year of manufacture, maintenance record, etc. When a worker is being monitored using the systems, devices and methods herein, the worker can be associated with a variety of identifying information, such as trade, company, hourly wage, age, employer, experience level, certifications, licensures, physical features (eye color, height, hair color), digital images, among other types. The tags and associated information can be stored at 139 in one or more database(s) for real-time analysis, as needed.

Once the monitoring devices have been assigned to worker(s) and/or asset(s), operation of the constructed network can be initiated at 142. For example, the beacons are activated to begin monitoring of the worker(s) and/or asset(s) through their associated monitoring devices. In a significant aspect, the monitoring devices of the present disclosure comprise a low energy smart Bluetooth® transceiver or transmitter. The monitoring device associated with the asset or worker to be monitored in the location over time can comprise hardware providing at least motion, acceleration and/or speed sensing capability provided by, for example, an accelerometer. Put another way, the information generated from the monitoring devices allows the activity of the worker or asset to be tracked in the constructed network over an extended period. The monitoring device can also include a temperature sensor and/or humidity sensor so as to, for example, determine the working conditions under which the worker or asset is subjected during his shift. Such information can be used to ensure that the worker does not exceed established exposure safety limits. Battery level (e.g., voltage) can also be measured to allow timely replacement. Buzzers or other signaling functionality can be included to provide notifications to the worker, such as in emergency situations. Smart notifications can also be provided to site supervisors and/or construction managers overseeing the worker or the site.

The monitoring device can also comprise processing circuitry including a microprocessor and memory in operational communication with the hardware and sensors of the monitoring device, as well as with the plurality of fixed beacons including low energy smart Bluetooth® transceivers (or receivers/transmitters) in the constructed network as discussed previously. When a locational signal is transmitted from the monitoring device and received at a plurality of the Bluetooth® transceivers (or receivers/transmitters) that comprise the constructed network, information about the monitoring device (that is, the asset or worker being monitored over time) can be reviewed and analyzed in real time to determine the location and/or other conditions of the associated worker or asset, or such information can be stored as data in the database(s) for analysis at a later time.

The Bluetooth® transceiver (or transmitter/receiver) incorporated in the monitoring devices utilizes a single mode when providing location information, which is a low energy implementation. The use of low energy smart Bluetooth® devices extends battery life, as would be recognized. Notably, for asset or worker tracking over extended periods, battery longevity can be highly desirable. The utility of the monitoring devices, and therefore the effectiveness of the asset and worker monitoring, can be greatly reduced if the devices need frequent recharging and/or battery changes or replacement. As such, the present disclosure includes an implementation that extends battery life substantially. In some aspects, the battery life in the monitoring device is at least about 3 months, or at least about 6 months, or at least about 9 months or at least about 12 months, or greater than about 1 year, or up to about 2 years. The monitoring devices can be powered with, e.g., a CR2032 ("coin") battery that has a 3V nominal voltage and a 225 mAh typical capacity, or any other suitable battery power.

At 145, one or more beacon(s) can transmit a signal to elicit a response from one or more monitoring device(s). The Bluetooth® transceivers (or receivers/transmitters) in the beacons can be configured to transmit interrogation signals (called "advertisements") to the Bluetooth® transceivers (or receivers/transmitters) uniquely associated with the monitoring devices associated with the workers or assets periodically. When Bluetooth® transceivers (or receivers/transmitters) of the monitoring devices that are present in the constructed network receive this interrogation signal/advertisement at 148, each low energy Bluetooth® transceiver (or receiver/transmitter) receiving the appropriate signal switches from a "sleep mode" to a "transmit mode." As used herein, the "sleep mode" is a period in which the monitoring device does not transmit a location or other signal. Yet further, in the "sleep mode," the monitoring device uses substantially no battery or other electric power. The "transmit mode" is a period when the low energy Bluetooth® transceiver (or receiver/transmitter) of the monitoring device is in an "ON" state in which the Bluetooth® transceiver or transmitter is capable of providing one or more signals to the Bluetooth® transceiver or receiver of the beacons in the constructed network. The transmitted signal can provide location information, as well as including other activity data. When the monitoring device is in the "transmit mode," a locational signal will be transmitted to the beacons, where that locational signal will be associated with the unique tag that identifies the asset or worker assigned to that monitoring device. Still further, when the monitoring device is in "transmit mode," one or more additional signals can be sent to the beacons, such as speed, direction, temperature, humidity, etc.

Switching from "sleep" to "transmit" modes is provided between a plurality of monitoring devices, where each monitoring device is uniquely associated with an asset or worker that is to be monitored during a monitoring period. Switching from one mode to another can occur substantially simultaneously after the Bluetooth® transceiver (or receiver/transmitter) of a beacon generates an advertising event so that locational data (and any other data that might be transmitted during one period) for all, or substantially all, of the monitoring devices can be transmitted for the time where the monitoring device is in a "transmit" mode. The "transmit" mode is configured to be as short as possible so as to use as little energy as possible. The "transmit" mode can be configured to last about less than about 1 second or less than about 5 seconds or less than about 10 seconds.

It has been found that when the Bluetooth® transceiver (or receiver/transmitter) of the monitoring devices are on for such short periods, the battery life of each monitoring device can be extended substantially, thus enhancing the utility of the monitoring devices in the uses disclosed herein. The periodicity at which the locational information is transmitted by the monitoring device also affects the battery life. With this in mind, the interval between interrogations/advertisements by the beacons, and thus the interval between transmissions by the monitoring device, can be selected to balance between extending the battery life and providing sufficient information to the situation. For example, 15-minute updates may be adequate for construction sites, while shorter intervals may be appropriate for other applications.

Referring back to FIG. 3, the activity data received at 148 can be provided by the beacons to a computing device located on the site with the constructed network, where the data can be stored and/or transmitted to a remote server (e.g., one or more computing devices in the cloud) at 151. In some cases, activity data can be continuously received by the local computing device and transmitted to the remote server. In some aspects, the beacons can be configured to transmit the activity data directly to the remote server through a WiFi, cellular or other appropriate communication network. The data can also be stored in database(s) associated with the remote server. Processing of the activity data can be accomplished by the server in real time (or near real time) at 154. In some implementations, processing can also be carried out by the local computing device.

Given that the transmission times between the beacons, local computing device and/or remove server or computing device occurs within a fraction of a second, and the processing speeds of current computing devices, it is possible for remote server to generate real time (or near real time) responses based upon the activity data. For example, notifications can be provided to the worker via the monitoring device, or to a site supervisor or construction manager through a user device. At 157, it is determined whether the event monitoring should be continued. If yes, then the flow goes to 115 where it is determined if the metes and bounds of the location being monitored has changed as previously described. Further activity data can then be acquired as previously described. If no, then the collection of the activity data can be terminated at 160, and the constructed network may be deactivated. The notifications can be generated as a report, or rendered for visual presentation. For example, the notification can be displayed on a user device such as a smartphone, tablet, laptop or other appropriate computing device via a web application.

In one aspect, during one or more monitoring events, the monitoring device will transmit data about the location, speed/movement and environmental temperature and/or humidity, of the asset or worker over a period of time in the constructed network. The period of time during which the one or more assets or workers are monitored at the specified location is defined as a "monitoring event." During one or monitoring events, when the monitoring device is in the "transmit mode," the monitoring device will record an "electronic breadcrumb trail" that comprises information about the locations of the monitoring device, and therefore the asset or worker. Such monitoring device information may be used after the conclusion of the monitoring event to at least prove the locations and speed of transit of the monitoring device, and therefore the associated asset or worker, during the one or monitoring events. If the cumulative monitoring device information is of sufficient detail to demonstrate locations and speed of movement of the monitoring device, and by inference the activity of the asset(s) or workers being tracked, the monitoring device information may be suitable to reconstruct the locations, time of presence in a location, speed of travel in a location, absence from a location, or any other information that may be useful.

In a significant aspect, the monitoring device information transmitted during the plurality of transmission periods for each monitoring device will be received by the fixed beacons that make up the constructed network defined by the location to be monitored. The Bluetooth® transceiver (or receiver/transmitter) of the monitoring devices generally do not store the data; rather, the monitoring device information is generally uploaded into a local computer or other computing device, or uploaded into the cloud for storage and analysis.

Information about monitoring device speed amongst a low or high threshold (or vice versa) may be of interest to demonstrate the speed that an asset or worker traveled within the location during a period of interest. For example, the speed at which a worker moves within a constructed network can be of interest when information in addition to mere presence or absence is relevant either in real time or after the fact. If the worker is present, but not moving among various locations in the constructed network, it might be inferred that the worker is or was not actually working while present on the site.

Yet further, the monitoring device may comprise a temperature sensor and/or a humidity sensor. Information regarding temperature, whether in the form of actual temperature measurements or temperature changes among thresholds may allow inferences that the monitoring device was moved from outside to inside of a building, for example, or the conditions under which the worker or asset was subjected to during one or more periods in a monitoring period. Humidity can also affect the impact of temperature on a worker. In addition, humidity and temperature sensors can be used to monitor the condition of an asset. For example, if a monitoring device is embedded within a concrete structure during pouring, then the humidity and/or temperature sensors can be used to monitor the curing of the concrete. By actively monitoring inside the concrete structure, it may be possible to identify when the structure is sufficiently cured to begin the next phase of the construction. The ability to identify the location of the monitoring device makes is possible to monitor multiple structures as they cure in parallel. This ability can potentially reduce the construction time or avoid potential failures by making it possible to identify when the structure is adequately cured for the next construction phase.

The information generated from the plurality of monitoring devices located in a constructed network during the monitoring event, can be presented to a user for visualization in "dashboard" form. As would be recognized, a dashboard is a tool that displays relevant metrics and data in visualized form in a concise and usable form on a single screen. For example, a graphical representation of the location being monitored can be rendered for display, with the location of some or all of the worker(s) and/or asset(s) being indicated on the dashboard display in real time (or near real time). Other information associated with the worker(s) and/or asset(s) can also be actively displayed or accessed through the dashboard. In accordance with the variety of differing information obtainable from the information, the dashboard can be tailored for different users. The dashboard feature can also be customized for specific uses. The information generated from the plurality of monitoring devices during the monitoring event can also be incorporated into spreadsheets for analysis and report generation.

Figure 4:
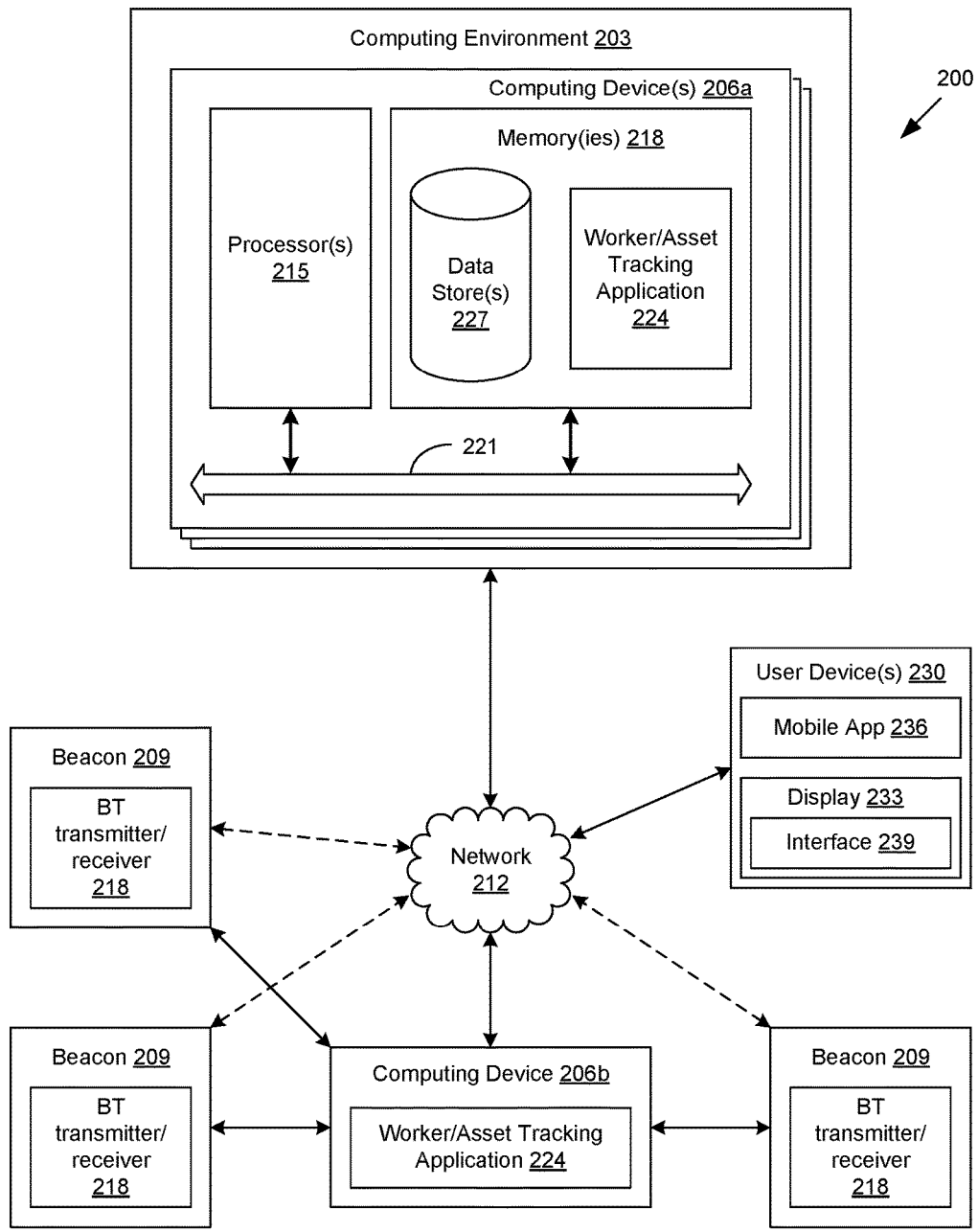
FIG. 4 is a graphical representation of an example of a networked environment for the asset and/or worker tracking of FIG. 1, in accordance with various embodiments of the present disclosure.

Referring next to FIG. 4, shown is an example of a networked environment 200 in accordance with various embodiments of the present disclosure. The networked environment 200 includes a computing environment 203 including one or more computing devices (e.g., one or more server) 206a and a constructed network comprising a plurality of beacons 209 in data communication with the computing environment 203 via a computing device 206b located at the area being monitored and a network 212. In some implementations, the beacons 209 can be in data communication with the computing environment 203 via a network 212. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

As illustrated in the example of FIG. 4, the computing environment 203 can include one or more computing devices 206a. Each computing device 206a includes at least one processor circuit, for example, having a processor 215 and a memory 218, both of which are coupled to a local interface 221. To this end, each computing device 206a may comprise, for example, at least one server computer or like device. The local interface 221 may comprise, for example, a data bus with an accompanying address/control bus or other bus structure as can be appreciated. This configuration is equally applicable to the computing device 206b located at the area being monitored.

Stored in the memory 218 can be both data and several components that are executable by the processor 215. In particular, stored in the memory 218 and executable by the processor 215 are a worker/asset tracking application 224, and potentially other applications. The worker/asset tracking application 224 can be executed on separate computing devices 206a or may be executed by a single computing device 206a. Also stored in the memory 218 may be one or more data store(s) 227 and other data. In addition, an operating system may be stored in the memory 218 and executable by the processor 215.

It is understood that there may be other applications that are stored in the memory 218 and are executable by the processor 215 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components can be stored in the memory 218 and are executable by the processor 215. In this respect, the term "executable" means a program file that is in a form that can ultimately be run by the processor 215. Examples of executable programs may be, for example, a compiled program that can be translated into machine code in a format that can be loaded into a random access portion of the memory 218 and run by the processor 215, source code that may be expressed in proper format such as object code that is capable of being loaded into a random access portion of the memory 218 and executed by the processor 215, or source code that may be interpreted by another executable program to generate instructions in a random access portion of the memory 218 to be executed by the processor 215, etc. An executable program may be stored in any portion or component of the memory 218 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 218 is defined herein as including both volatile and nonvolatile memory and data storage components. Volatile components are those that do not retain data values upon loss of power. Nonvolatile components are those that retain data upon a loss of power. Thus, the memory 218 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 215 may represent multiple processors 215 and/or multiple processor cores and the memory 218 may represent multiple memories 218 that operate in parallel processing circuits, respectively. In such a case, the local interface 221 may be an appropriate network that facilitates communication between any two of the multiple processors 215, between any processor 215 and any of the memories 218, or between any two of the memories 218, etc. The local interface 221 may comprise additional systems designed to coordinate this communication, including, for example, performing load balancing. The processor 215 may be of electrical or of some other available construction.

The beacons 209 are representative of one or more devices that can comprise a Bluetooth® transceiver (or transmitter/receiver), which can facilitate communication between the monitoring devices associated with the worker(s) and/or asset(s). The Bluetooth® transceiver (or transmitter/receiver) can also be configured to communication with the local computing device 206b. In some embodiments, the beacons 209 can include other communication interfaces (e.g., WiFi or cellular) that can be used to communicate directly with the computing device(s) 206a through a network 209. The beacons 209 can track the locations of one or more monitoring device(s) based upon, e.g., measured signal strength and direction. Triangulation of multiple signals can be used to determine a location of the monitoring device, and thus the associated worker or asset. Calibration data can be used to improve the accuracy of the determined location.

User device 230 is representative of one or more mobile user devices that may be in data communication with the computing environment 203 via the network 209. A mobile user device 230 can comprise, for example, a processor-based system such as a computer system. Such a computer system may be embodied in the form of a laptop computer, personal digital assistants, cellular telephones, smartphones, web pads, tablet computer systems, or other devices with like capability. The user device 230 can include a display 233 such as, for example, a liquid crystal display (LCD) display, gas plasma-based flat panel display, organic light emitting diode (OLED) display, LCD projector, or other types of display devices, etc.

The user device 230 can be configured to execute various applications such as a mobile application 236 and/or other applications. The mobile application 236 may be executed to enable the user to receive notifications through the worker/asset tracking application 224. The mobile application 236 may be executed in the mobile user device 230, for example, to allow a user to access data, notifications and/or other information for, e.g., the tracking of worker(s) and/or asset(s) at a location that is being monitored. Access to the activity information can be provided through a user interface 239 rendered on the display 215. The mobile user device 230 may be configured to execute applications beyond the mobile application 236 such as, for example, word processing applications, browsers, email applications, and/or other applications. The mobile application 236 can be configured to transfer information between the user device 230 and worker/asset tracking application 224 through a secure link (e.g., using HTTPS/SSL communication protocol) via network 212.

Although the worker/asset tracking application 224, mobile application 236 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the worker/asset tracking application 224, mobile application 236 or other application that comprises software or code can be embodied in any non-transitory computer-readable medium for use by or in connection with an instruction execution system such as, for example, a processor 215 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Various applications and/or other functionality supported by the worker and/or asset tracking may be executed in the computing environment 203, in the computing device 206b and/or in the user device 230, in accordance with various embodiments of the present disclosure. The components executed on the computing environment 203 for the worker and/or asset tracking include, for example, the worker/asset tracking application 224, and other applications, services, processes, systems, engines, or functionality not discussed in detail herein. The worker/asset tracking application 224 can be implemented as a single application or as a combination of applications, which may be executed on separate computing devices or on a common computing device. Databases may be located separate computing devices or may be operating in separate partitions on a common computing device. Such computing devices may be located in a single installation or may be distributed among many different geographical locations. Various data can stored in data stores 227 of the computing devices 206a and 206b. The data stored in the data stores 227 may also be associated with the operation of the various applications and/or other functionality supported by the worker/asset tracking.

The flow diagrams of FIGS. 1-3 illustrate the architecture, functionality, and operation of a possible implementation of the worker/asset tracking as presented in this disclosure. In this regard, each block represents a module, segment, or portion of code, which comprises one or more executable instructions for implementing the specified logical function(s). It should also be noted that in some alternative implementations, the functions noted in the blocks may occur out of the order noted in FIGS. 1-3. For example, two blocks shown in succession in FIGS. 1-3 may in fact be executed substantially concurrently or the blocks may sometimes be executed in the reverse order, depending upon the functionality involved.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method of tracking workers or assets in a location, comprising:
    identifying, to at least one computing device, a location to be monitored, where an arrangement of structural components within the location to be monitored changes during a monitoring period, and where metes and bounds of the location to be monitored remain substantially constant over the monitoring period;
    uploading, to the at least one computing device, information regarding the metes and bounds of the location to be monitored;
    determining, by the at least one computing device, a number of Bluetooth beacons suitable to provide substantially full coverage for receiving activity signals generated from one or more monitoring devices located within the location to be monitored during, the monitoring period, each of the one or more monitoring devices associated with a worker or an asset;
    positioning the Bluetooth beacons at corresponding fixed positions thereby providing a constructed network for monitoring the location, the Bluetooth beacons configured to provide the substantially full coverage for receiving activity signals generated from one or more monitoring devices located within the location to be monitored during the monitoring period;
    associating, via the at least one computing device, the worker or asset with a monitoring device of the one or more monitoring devices, the monitoring device comprising a low energy Bluetooth transmitter, a battery, a temperature sensor and an accelerometer, where the association with the worker or asset comprises at least one unique identifying feature that allows a signal transmitted by the monitoring device to be accurately associated with the worker or asset;
    periodically transmitting an advertising signal from the Bluetooth beacons to each monitoring device of the one or more monitoring devices within the constructed network over the monitoring period, where each monitoring device within the constructed network, independently, transmits an activity signal to the Bluetooth beacons during each signal transmission period associated with the advertising signal, thereby generating a plurality of activity signals associated with the worker or asset associated with that monitoring device, where the plurality of activity signals received by the Bluetooth beacons provide substantially accurate activity information about the worker or asset associated with that monitoring device within the constructed network during the monitoring period; and
    communicating the activity information to the at least one computing device from the Bluetooth beacons, the activity information associated with the worker or asset identified by the at least one unique identifying feature.

2. The method of claim 1, wherein uploading information regarding the metes and bounds of the location to be monitored comprises inputting building information modeling (BIM), blueprints or survey information that define all or part of the metes and bounds of the location to be monitored.

3. The method of claim 1, wherein the location to be monitored is a construction site.

4. The method of claim 1, wherein a change to the arrangement of structural components comprises addition of at least one new structural component within the location to be monitored during the monitoring period.

5. The method of claim 4, wherein the new structural component is fabricated from concrete, and further comprising providing a monitoring device within the new structural component during fabrication of the new structural component, the monitoring device comprising a temperature sensor, a humidity sensor, or both.

6. The method of claim 1, wherein the Bluetooth beacons are positioned to provide overlapping coverage for receiving activity signals generated from the one or more monitoring devices located within the location to be monitored.

7. The method of claim 1, further comprising calibrating the constructed network based upon a calibration grid defined by an array of cells entirely covering the location to be monitored, each cell of the calibration grid comprising capture coordinates associated with that cell.

8. The method of claim 7, wherein calibrating the constructed network comprises:
    positioning a monitoring device at the capture coordinates of a cell of the calibration grid; and
    receiving, by a plurality of the Bluetooth beacons, an activity signal from the monitoring device at the capture coordinates of that cell, wherein each of the plurality of Bluetooth beacons determine calibration data corresponding to the activity signal transmitted by the monitoring device from the capture coordinates of that cell, the calibration data comprising signal strength and signal direction associated with that cell.

9. The method of claim 7, wherein activity signals received by a Bluetooth beacon during signal transmission periods associated with the advertising signal are adjusted based at least in part upon calibration data determined during calibration of the constructed network.

10. The method of claim 1, wherein the at least one computing device comprises a remotely located server and the method further comprises determining, by the remotely located server, a location for each worker or asset within the constructed network based upon the activity information.

11. The method of claim 10, wherein the at least one computing device comprises a local computing device in communication with the Bluetooth beacons, where the activity information is communicated to the remotely located server via the local computing device.

12. The method of claim 10, further comprising determining, by the remotely located server, that a worker or asset has left the location to be monitored based at least in part upon the activity information and the metes and bounds of the location to be monitored.

13. The method of claim 10, further comprising:
    determining, by the remotely located server, that a worker has entered a restricted area of the location to be monitored based at least in part upon the activity information; and
    providing, by the remotely located server, a near real time notification to a site supervisor or a construction manager, where the notification indicates the presence of the worker in the restricted area.

14. The method of claim 13, wherein the remotely located server provides a notification to the monitoring device, and the monitoring device provides a physical indication to the worker in response to the notification.

15. The method of claim 1, comprising
    positioning, in response to a change in the metes and bounds of the location to be monitored, additional Bluetooth beacons at corresponding fixed positions thereby expanding the constructed network for monitoring an additional area of the location to be monitored resulting from the change in the metes and bounds, the additional Bluetooth beacons configured to provide substantially full coverage for receiving activity signals generated from the one or more monitoring devices located within the additional area of the location during the monitoring period; and periodically transmitting an advertising signal from the additional Bluetooth beacons to each monitoring device within the additional area over the monitoring period, where each monitoring device within the additional area, independently, transmits an activity signal to the additional Bluetooth beacons during each signal transmission period associated with the advertising signal, thereby generating a plurality of activity signals associated with the worker or asset associated with that monitoring device.

16. A system for tracking workers or assets in a location, comprising:

a constructed network comprising a plurality of Bluetooth beacons located at corresponding fixed positions for monitoring a location, where an arrangement of structural components within the location to be monitored changes during a monitoring period, and metes and bounds of the location to be monitored remain substantially constant over the monitoring period, and where the Bluetooth beacons are configured to provide substantially full coverage for receiving activity signals generated from one or more monitoring devices located within the location to be monitored during the monitoring period;

a plurality of monitoring devices comprising a low energy Bluetooth transmitter, a battery, a temperature sensor and an accelerometer, where each of the plurality of monitoring devices is associated with a worker or asset by at least one unique identifying feature that allows a signal transmitted by the monitoring device to be accurately associated with the worker or asset, and where each of the plurality of monitoring devices within the constructed network, independently, transmits an activity signal to the constructed network during each signal transmission period associated with an advertising signal periodically transmitting by the plurality of Bluetooth beacons, thereby generating a plurality of activity signals associated with the worker or asset associated with that monitoring device, where the plurality of activity signals provides substantially accurate activity information about the worker or asset associated with that monitoring device within the constructed network during the monitoring period; and a remotely located computing environment comprising one or more computing device configured to receive activity information from at least a portion of the plurality of Bluetooth beacons, process the activity information to determine a condition of the worker or asset associated with one of the plurality of monitoring devices, and generate one or more real time notification based upon the determined condition of the associated worker or asset.

17. The system of claim 16, further comprising a local computing device in the location to be monitored, the local computing device configured to receive the activity information from the plurality of Bluetooth beacons, communicate the activity information to the remotely located computing environment, and store the activity information in a local data store.

18. The system of claim 17, wherein the one of the plurality of monitoring devices comprises a buzzer that is activated in response to the one or more real time notification.

19. The system of claim 16, wherein the condition determined by the one or more computing device is a location of the worker or asset associated with the one of the plurality of monitoring devices, the location determined based at least in part upon the activity information and calibration data acquired by the plurality of Bluetooth beacons.

20. The system of claim 16, wherein the plurality of Bluetooth beacons comprise a first set of Bluetooth beacons positioned on a first level of a construction site and a second set of Bluetooth beacons positioned on a second level of the construction site, where the first set of Bluetooth beacons are configured to provide substantially full coverage for receiving activity signals generated from one or more monitoring devices located on the first level of the construction site and the second set of Bluetooth beacons are configured to provide substantially full coverage for receiving activity signals generated from one or more monitoring devices located on the second level of the construction site.

* * * * *